(12) United States Patent
Serrano (10) Patent No.: US 7,270,007 B2
(45) Date of Patent: Sep. 18, 2007

(54) APPARATUS AND METHOD FOR REDUCING VIBRATION

(76) Inventor: Norman S. Serrano, 4331 E. Baseline Suite B-105-210, Gilbert, AZ (US) 85234

( * ) Notice: Subject to any disclaimer, the term of this patent is extended or adjusted under 35 U.S.C. 154(b) by 133 days.

(21) Appl. No.: 11/145,109

(22) Filed: Jun. 3, 2005

(65) Prior Publication Data

US 2006/0272420 A1    Dec. 7, 2006

(51) Int. Cl.
*G01M 1/38* (2006.01)
*G01M 1/16* (2006.01)

(52) U.S. Cl. .......................... 73/649; 73/460; 700/280

(58) Field of Classification Search .................. 73/649, 73/460–462, 468, 650, 658, 660, 66; 700/279–280; 451/5, 343; 318/150
See application file for complete search history.

(56) References Cited

U.S. PATENT DOCUMENTS

| | | | |
|---|---|---|---|
| 4,419,894 A | 12/1983 | Matumoto | |
| 5,073,217 A | 12/1991 | Fogal | |
| 5,218,885 A | 6/1993 | Nakano et al. | |
| 5,367,399 A | 11/1994 | Kramer | |
| 5,688,160 A * | 11/1997 | Pozzetti et al. | 451/5 |
| 5,969,447 A | 10/1999 | Periyathamby et al. | |
| 6,360,593 B1 | 3/2002 | Schoenfeld | |
| 6,426,602 B1 * | 7/2002 | McCann et al. | 318/432 |
| 6,510,715 B1 | 1/2003 | Simsek | |
| 6,595,053 B2 * | 7/2003 | Parker | 73/462 |
| 6,754,568 B1 * | 6/2004 | Ripley | 701/29 |
| 6,874,364 B1 * | 4/2005 | Campbell et al. | 73/593 |
| 6,874,366 B2 * | 4/2005 | Magne Ortega et al. | 73/649 |
| 6,879,882 B2 * | 4/2005 | Montanari et al. | 700/279 |
| 6,920,794 B2 * | 7/2005 | Luo et al. | 73/660 |
| 7,066,028 B2 * | 6/2006 | Dondi | 73/649 |
| 7,104,342 B2 * | 9/2006 | Berg | 173/1 |

* cited by examiner

*Primary Examiner*—Hezron Williams
*Assistant Examiner*—Jacques M. Saint-Surin
(74) *Attorney, Agent, or Firm*—Robert D. Atkins; Quarles & Brady LLP (57) ABSTRACT

A method of reducing vibration in equipment having first and second mechanically connected subassemblies is disclosed. A sensor is disposed on the first subassembly. A vibration from the sensor is recorded. The vibration is attributable to a composite mechanical operation of the first and second subassemblies of the equipment. The vibration data representative of the vibration is provided to a remote system for vibration analysis. A system for performing vibration analysis of equipment having first and second mechanically connected subassemblies is disclosed. A sensor is adapted for mounting to the first subassembly. The sensor is capable of recording a vibration attributed to a composite mechanical operation of the first and second subassemblies of the equipment. A recorder is coupled to the sensor. A vibration analyzer receives the vibration data and performs vibration analysis of the equipment from the vibration data.

27 Claims, 8 Drawing Sheets

APPARATUS AND METHOD FOR REDUCING VIBRATION

FIELD OF THE INVENTION

The present invention relates in general to dynamic balancing and, more particularly, to a method and apparatus for dynamic balancing of a mechanical system or mechanical assembly.

BACKGROUND OF THE INVENTION

Historically, dynamic balancing has referred to the process, generally performed through the use of a balancing machine, of reducing vibration in a rotor piece. In order to remove residual unbalance of worked rotor pieces, dynamic or centrifugal balancing machines have typically been used to detect the amount and angular location of the unbalance.

In known dynamic balancing machines, a rotor piece is supported on flexible bearings at opposite axial ends, and is rotated. Pick-up units are coupled with the bearings to pick up once-per-revolution vibratory motion of the bearings of forces on the bearings due to unbalance of the rotor piece. Amounts of unbalance at axial opposite-end planes of the rotor piece are obtained from amplitudes of signals picked up by respective pick-up units.

Two typical methods are used for detecting the angular location of unbalance of the rotor, one being the stroboscopic method, and the other being the photocell method. Both methods require an operator to physically mark reference numbers on the rotor piece.

Based on the measured amount or amplitude of the unbalance and identified angular location of the unbalance, dynamic balancing machines generally suggest a physical location to either add, or remove, mass in order to reduce unbalance of the rotor piece and thereby reduce vibration.

Dynamic balancing machines and the accompanying methods of balancing have generally become increasingly sophisticated. The associated vibration of a rotor piece can be reduced with a relatively high degree of precision and accuracy. However, dynamic balancing machines and the accompanying methods of balancing are used to precisely and accurately balance a single rotor piece, or component of a mechanical system or assembly. While dynamic balancing may reduce or eliminate the vibration associated with a single rotor piece, individual dynamic balancing of single components may not eliminate, and may in some cases, exacerbate vibration when the balanced component is reconnected as part of a mechanical system or assembly of components.

A particular example of the problem of precisely and accurately balancing an individual component which is later inserted into a larger mechanical system is seen in racecars. Racecars are commonly driven to extremes, including extreme temperatures, extreme speeds and extreme engine revolutions-per-minute (RPM). High amounts of vibration commonly accompany high RPM in racecar engines. In an effort to reduce overall vibration, technicians remove and carefully balance individual components of the racecar. For example, a driveshaft, an example of a single rotor piece, is individually rotated and tested in a conventional dynamic balancer. When the technician reconnects the driveshaft to the remaining parts of the racecar's drivetrain, the overall vibration of the racecar is often unmitigated and sometimes exacerbated.

Reducing overall vibration in larger mechanical systems can be advantageous for many reasons. In the case of racecars, lower overall vibration of the racecar can result in greater overall horsepower and torque. Current devices and methods fall short in addressing problems of overall vibration. As a result, a need exists for an apparatus and method of dynamically balancing an assembly of component parts of a mechanical system.

SUMMARY OF THE INVENTION

In one embodiment, the present invention is a method of reducing vibration in equipment having first and second mechanically connected subassemblies, comprising disposing a first sensor on the first subassembly, recording a first vibration from the first sensor, the first vibration being attributed to a composite mechanical operation of the first and second subassemblies of the equipment, and providing first vibration data representative of the first vibration to a remote system for vibration analysis.

In another embodiment, the present invention is a method of reducing overall vibration in a machine having first and second mechanically connected components, comprising disposing a first sensor on the first component, recording a first vibration from the first sensor, the first vibration being attributed to a composite mechanical operation of the first and second components of the machine, and providing first vibration data representative of the first vibration to a remote system for vibration analysis.

In another embodiment, the present invention is a system for performing vibration analysis of equipment having first and second mechanically connected subassemblies, comprising a first sensor adapted for mounting to the first subassembly, the first sensor capable of recording a first vibration attributed a composite mechanical operation of the first and second subassemblies of the equipment, a recorder coupled to the first sensor for recording first vibration data representative of the first vibration, and a vibration analyzer for receiving the first vibration data and performing vibration analysis of the equipment from the first vibration data.

In yet another embodiment, the present invention is a method of making a system for performing vibration analysis of equipment having first and second mechanically connected subassemblies, comprising providing a first sensor adapted for mounting to the first subassembly, the first sensor capable of recording a first vibration attributed a composite mechanical operation of the first and second subassemblies of the equipment, providing a recorder coupled to the first sensor for recording first vibration data representative of the first vibration, and providing a vibration analyzer for receiving the first vibration data and performing vibration analysis of the equipment from the first vibration data.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

A method of reducing overall vibration in a mechanical system, machine or equipment can be performed which utilizes a plurality of sensors mounted on various mechanically connected components, subassemblies or subsystems of the overall system. Instead of physically removing the individual component, subassembly or subsystem from the system to obtain vibration data, and then reconnecting the subassembly or subsystem to the larger system, the subassembly can be left in place. The mechanical system can be tested as the system would normally operate, producing vibration in the process.

The vibration that is produced by the system, machine or equipment is representative of a composite mechanical operation of at least two individual subassemblies of the equipment. An individual vibration produced by a first subassembly can be changed (such as a change in vibration amplitude) in some way by the mechanical connection of a second subassembly. The angular location of an unbalance in a rotor piece can also be changed by the mechanical connection of subassemblies. By testing the system as a whole, the vibration data which is obtained more accurately depicts the picture of overall vibration. The data obtained from a sensor placed on an individual subassembly reflects the realized vibration at that location as a product of the composite mechanical operation of the system.

The sensors can measure vibration data during the testing process. A plurality of sensors, selected depending on the desired complexity of analysis, can provide independent data streams to a remote system for data analysis. The data streams are representative of the vibration which is detected at a specific location of the system.

The independent data streams which carry vibration information from each component of the mechanical system can be received by a remote system in a variety of ways. The data streams can be sent over traditional wires as electronic signals to the remote system. The data streams can be converted from electrical signals to radio frequencies, and sent over a wireless link to the remote system. Once received by the remote system, the data streams can be combined to provide a composite snapshot of the overall vibration of the mechanical system. The data streams can be recorded by the remote system. The data streams can be fed to a conventional dynamic balancer, which can be incorporated into the remote system. The remote system and accompanying onboard software can be adapted to simultaneously balance multiple components, subassemblies or subsystems using the independent data streams to reduce the overall vibration of the mechanical system.

Figure 1:
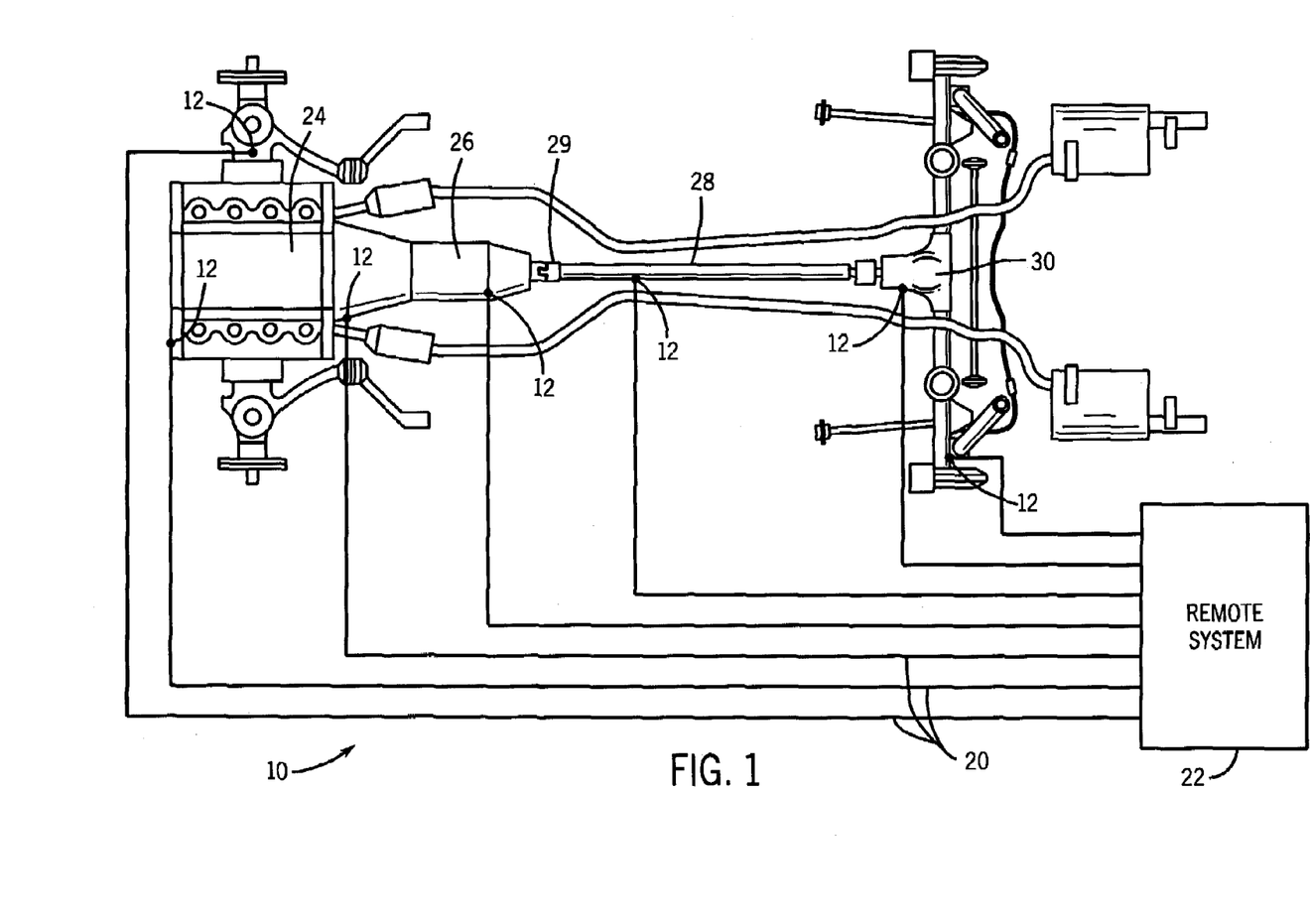
FIG. 1 illustrates a system of reducing vibration in a motor vehicle.

FIG. 1 illustrates an example vibration reduction system for use in a motor vehicle. Vibration reduction system 10 shows an engine coupled to a drivetrain of a motor vehicle. A plurality of sensors 12 are mounted, attached, or otherwise dedicated to specific subassemblies of the vehicle, including the front and aft axles, engine 24 and drivetrain components.

Figure 2A:
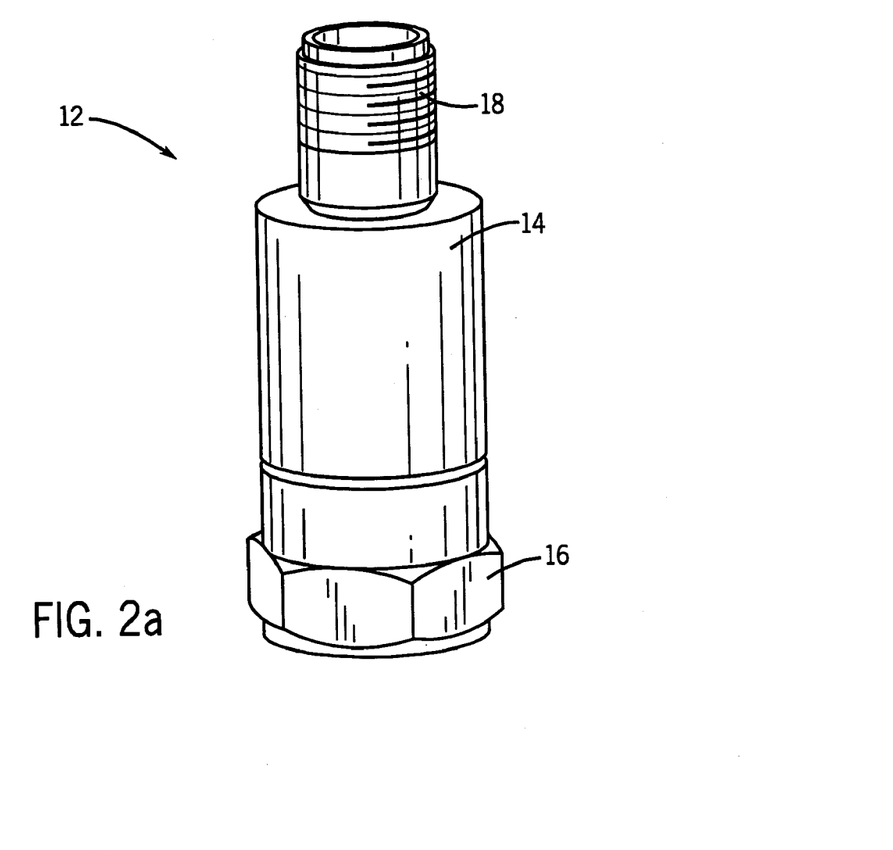
FIG. 2a illustrates an example of a vibration sensor with top-mounted connector.
Figure 2B:
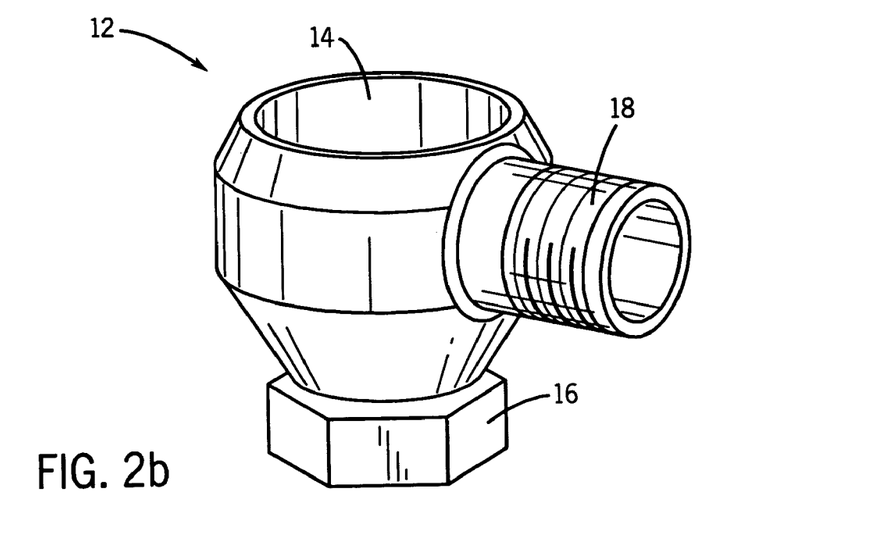
FIG. 2b illustrates an example of a vibration sensor with a side-mounted connector.

FIG. 2a shows a detailed view of a possible sensor 12 which is intended to detect vibration emanating from a particular component or subassembly of the motor vehicle. Sensor 12 can be any commonly obtained commercial or industrial vibration sensor or accelerometer. Sensor 12 includes body 14, mount 16 to allow sensor 12 to connect to a solid surface, and 2-pin electrical connector 18 which connects sensor 12 to an electric circuit. In one example, sensor 12 can have an electrical output which varies between 4 and 20 mA, and a frequency range of between 3 and 10 kHz. FIG. 2b illustrates a separate example of a sensor 12 with an optional side exit for connector 18.

Typically, for common accelerometer sensors 12, vibration is sensed in the axis that runs the length of the device. Piezoelectric crystals change vibration-induced mechanical energy to an alternating potential or voltage that reflects the frequency and vibration level, or size of the unbalance force. In addition to single axis accelerometer sensors 12, biaxial or triaxial sensors 12 can be used.

In addition to accelerometer sensors 12 and similar vibration sensors 12, photo optic probes can be used as sensors 12 to determine a phase angle measurement that indicates the location of the unbalance on the tested rotor piece. A photo optic sensor 12 generally uses reflective tape which can be attached either directly to the rotor piece or a mechanically connected subassembly, so long as the mechanically connected subassembly rotates at the same rate as the rotor piece. Mounted in a fixed position near the rotor piece, a photo optic sensor 12 has an emitter side that emits a red light beam and a receiver side that sees the reflected beam each time the reflective tape passes in front of the sensor 12. A photo optic sensor 12 can then process the reflected light and transmit a transistor-to-transistor (TTL) pulse signal to a remote system for analysis.

Returning to FIG. 1, the depicted motor vehicle includes engine 24 coupled to a drivetrain. The drivetrain includes transmission 26, driveshaft 28, universal joint 29, and rear differential 30. Additionally, front and aft axles are depicted. Sensors 12 can be mounted to locations on the motor vehicle which are stationary, yet are in close proximity to rotating pieces of the overall mechanical assembly to measure attendant vibration emanating from the rotor pieces. As shown, sensors 12 are coupled to or in close proximity to the front and rear wheel assemblies, the bell housing which connects engine 24 with transmission 26, the driveshaft 28 and the rear differential 30. Each of the locations is intended to detect and transmit attendant vibration emanating from the particular location.

Sensors 12 are connected to remote system 22 by wires 20. As described above, remote system 22 can receive information obtained from sensors 12 in a variety of ways, including through the use of a wireless link. Remote system 22 can include a number of components which can be integrated into a single unit or dispersed over a network. Remote system 22 can preprocess the incoming information from sensors 12 by filtering the information to remove extraneous noise. Remote system 22 can convert incoming analog electrical signals to digital signals for further processing by remote system 22.

Figure 3A:
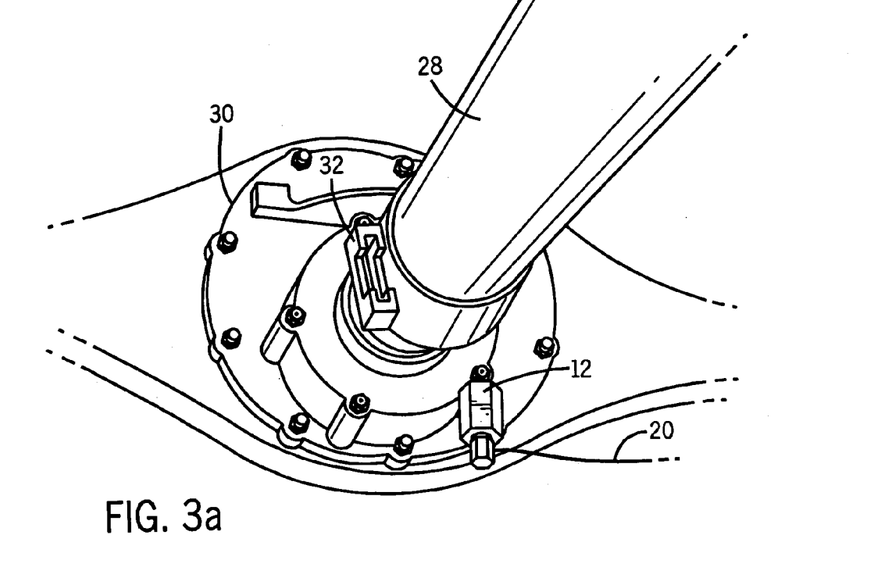
FIG. 3a illustrates an expanded example of the system depicted in FIG. 1 showing a sensor coupled to a rear differential.

FIGS. 3a-3e illustrate various example views of placement of a sensor 12 on a motor vehicle. FIG. 3a shows a sensor 12 which has been attached to a lower portion of a rear differential 30. Wire 20 is attached to sensor 12 to carry vibration information back to remote system 22. Rear differential 30 is coupled to driveshaft 28 by universal joint 32. Sensor 12 can be mounted to rear differential 30 by any method which securely fastens sensor 12 to rear differential 30. As shown, a bolt is used to secure sensor 12 to rear differential 30.

Because rear differential 30 is connected to various other subassemblies of the drivetrain and, eventually, the motor vehicle as a whole, certain mechanical characteristics of the other subassemblies, such as a driveshaft, can have positive or adverse effects on the vibration behavior of rear differential 30. Again, sensor 12 mounted to rear differential 30 can generate vibration data which reflects a composite mechanical operation of the drivetrain, and ultimately, the motor vehicle when the motor vehicle is tested as a single unit.

Figure 3B:
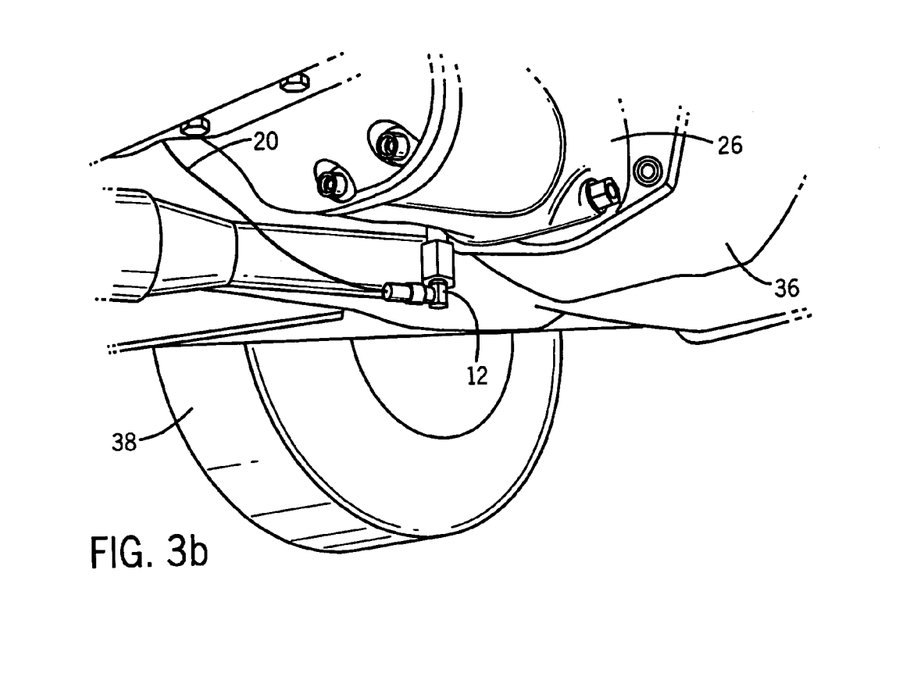
FIG. 3b illustrates an expanded example of the system depicted in FIG. 1 showing a sensor coupled to a transmission.

FIG. 3b illustrates a sensor 12 with accompanying wire 20 coupled to a lower portion of transmission 26. Coupled to transmission 26 is bell housing 36. Bell housing/flywheel area 36 can be an additional location to mount sensor 12.

Figure 3C:
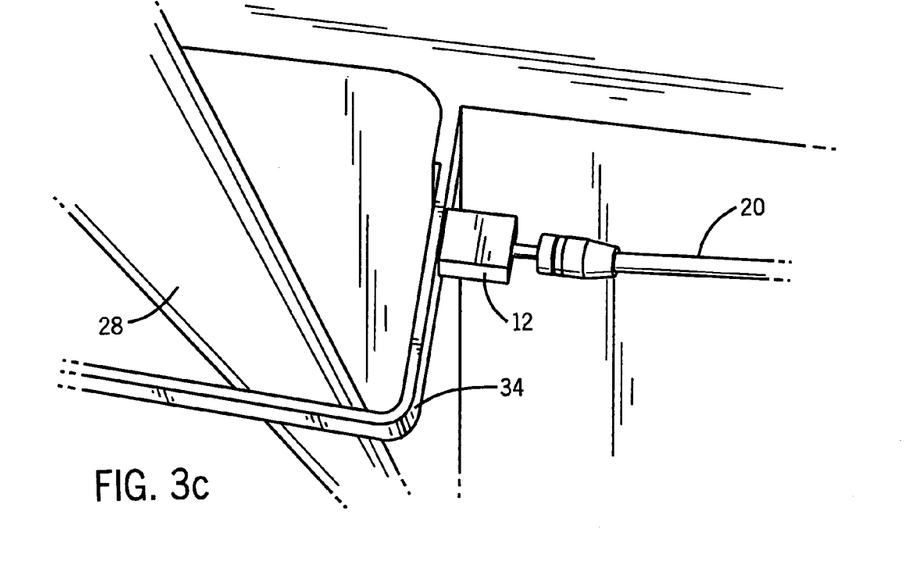
FIG. 3c illustrates an expanded example of the system depicted in FIG. 1 showing a photo optic sensor and an associated driveshaft.

FIG. 3c illustrates a photo optic sensor 12 with accompanying wire 20 mounted to a bracket 34 located in close proximity to a driveshaft 28. As described previously, reflective tape can be applied to driveshaft 28. When used in combination with a vibration sensor 12, photo optic sensor 12 can pinpoint the location of an imbalance in a rotor piece.

Figure 3D:
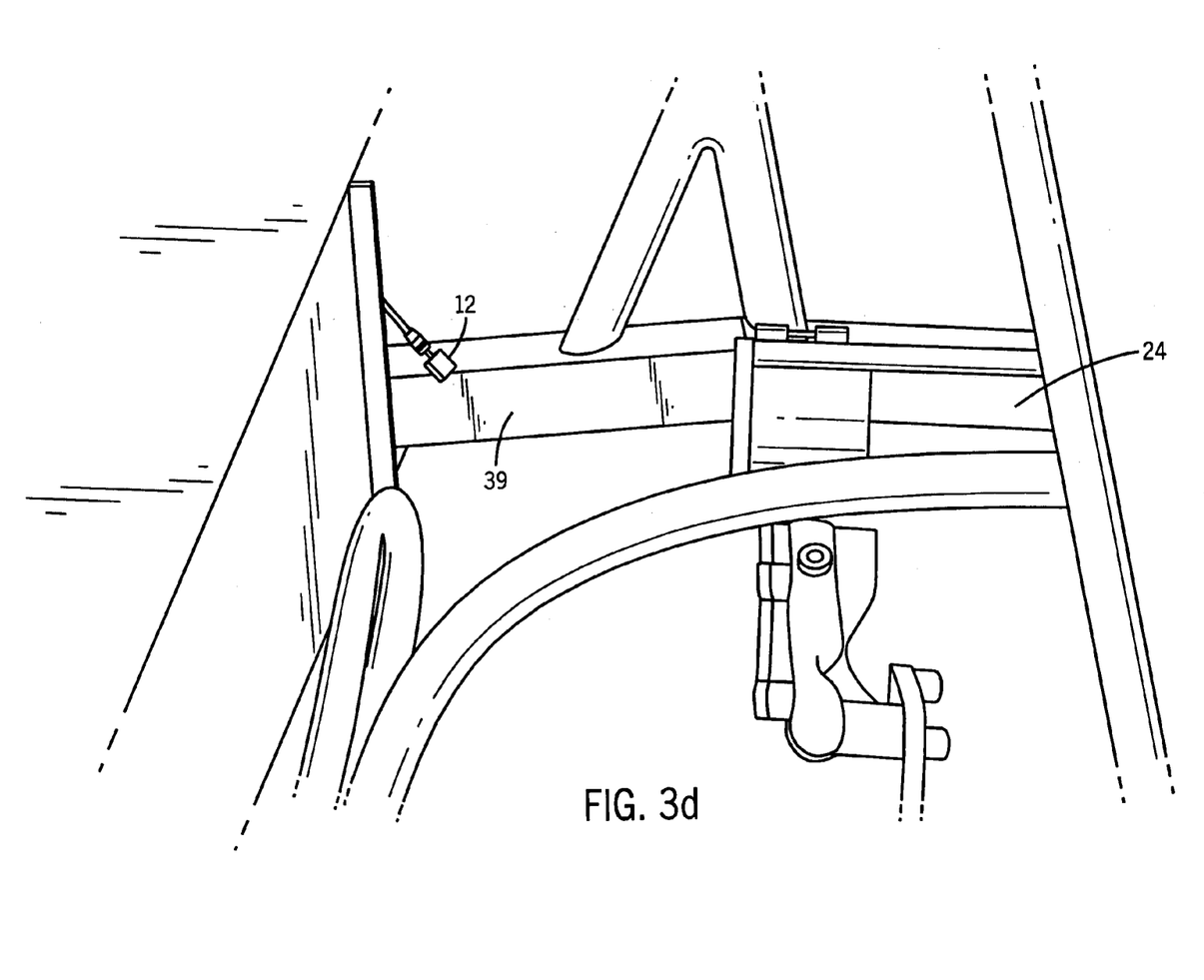
FIG. 3d illustrates an expanded example of the system depicted in FIG. 1 showing a photo optic sensor coupled to a front support of an engine.
Figure 3E:
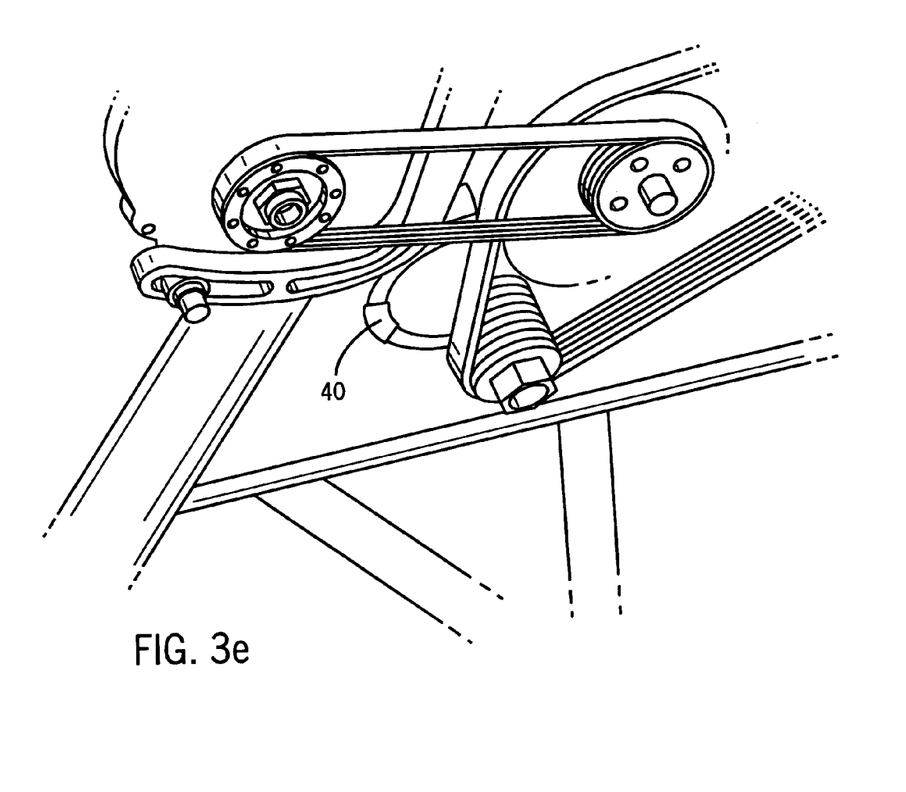
FIG. 3e illustrates an expanded example of the system depicted in FIG. 1 showing reflective tape affixed to a harmonic balancer of an engine.

FIG. 3d illustrates another possible location to mount a sensor 12. As shown, a photo optic sensor is mounted to a support 39 of a frame of a motor vehicle. A forward portion of an engine 24 is seen, with ancillary components such as a radiator and water pump. In the example, photo optic sensor 12 is mounted with an unobstructed view of the harmonic balancer of engine 24. FIG. 3e more clearly shows the view of the photo optic sensor 12 which includes the harmonic balancer 40 of engine 24. Reflective tape is seen affixed to a harmonic balancer 40 to, again, provide phase angle information to determine a location of an imbalance.

Sensors 12 can be mounted on a motor vehicle in any practical, stationary location in close proximity to a rotor piece which is intended to be analyzed for vibration. In addition to mounting a plurality of sensors 12 to various components or subassemblies of a motor vehicle, the method described above can be adapted to suit any mechanical assembly or mechanized equipment which includes at least one subassembly or component.

In a further example of reducing vibration in a mechanical system, consider the placement or dedication of a plurality of sensors to specific vibration locations on an outboard motor of a speedboat. A traditional method of balancing a propeller involves physically removing the propeller from the rest of the outboard motor assembly. The propeller is spun balanced using equipment similar to the balancer of a car tire. When completed, the balanced propeller is again reconnected to the outboard motor assembly, and thereby to the rest of the speedboat.

Using the present method of reducing vibration, a technician can install a plurality of vibration sensors at strategically placed subassemblies throughout the outboard motor assembly. A sensor 12 can be installed in a location that truly represents actual vibration taking place. In general, the most rigid area of a location that is closest to a rotor piece undergoing vibration is beneficial. A sensor 12 or plurality of sensors 12 can be dedicated to the boat's propeller. Additional sensors 12 can be mounted in stationary locations in close proximity to rotor pieces of the outboard motor, such as a driveshaft of the outboard motor or the engine of the outboard motor. The outboard motor can be tested as a single mechanical system, the sensors 12 providing vibration information for each respective location of a subassembly of the outboard motor. Again, vibration data is representative of a composite mechanical operation of each subassembly of the outboard motor.

Figure 4:
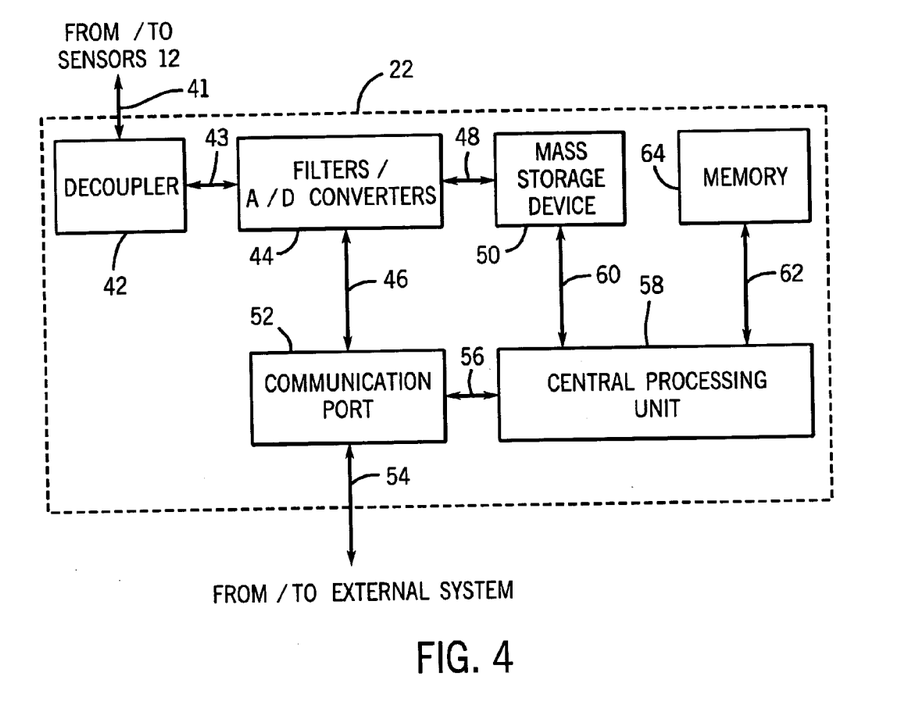
FIG. 4 illustrates a block diagram of a remote system for recording data and performing balancing calculations.

Turning to FIG. 4, an example remote system 22 is seen in greater detail. Electrical signals which are received from sensors 12 are depicted as link 41. Electrical signals from sensor 12 can be received in a decoupler 42. Decoupler 42 can supply current to sensor 12 to power sensor 12. Decoupler 42 can receive and isolate the signal received from sensor 12. The isolated signal can be forwarded from decoupler 42 through link 43 to filter 44. In a separate example, link 41 can include a wireless link such as IEEE 802.11b wireless protocol or an equivalent, in which case a decoupler 42 is unnecessary.

Filter 44 can include electrical components which are intended to filter the electrical signal to reduce ambient noise from the electrical signal. Filter 44 can also contain analog-to-digital (A/D) converters which serve to convert an analog electrical signal to a digital signal. In a separate example, sensors 12 can contain A/D converters integrated into the body 14 of sensors 12. Filter 44 can include a plurality of filters which filter an incoming electrical signal on a particular channel. The channel can be representative of a particular sensor, the location of the sensor and associated data.

As shown in FIG. 4, filter 44 can forward the filtered electrical signal or digital data stream through link 48 to a mass storage device 50 integrated into remote system 22. Mass storage device 50 can include such devices as a digital audio tape (DAT) device, hard disk, optical drive or similar. Device 50 can store data received from sensors 12 to be later analyzed by remote system 22 or an external system.

In addition to forwarding information to mass storage device 50, filter 44 can forward information through link 46 to a communication port 52 also integrated into remote system 22. Communication port 52 can direct incoming information externally to an external source through link 54. Communication port 52 can route incoming and outgoing information through link 56 to and from central processing unit 58. Central processing unit (CPU) 58 can employ common microchip technology. Central processing unit can route information received from sensors 12 through link 62 to and from onboard memory 64.

CPU 58 can utilize onboard software to process vibration information. In one example, CPU 58 can employ software to combine each digital channel of vibration information into a composite which can be viewed by a technician on a graphical user interface (GUI). The generated composite can be a snapshot of the overall vibration picture of a mechanical system of assemblies. CPU 58 can use onboard software to process vibration information received from sensors 12 in a manner similar to conventional dynamic balancing machines.

Figure 5:
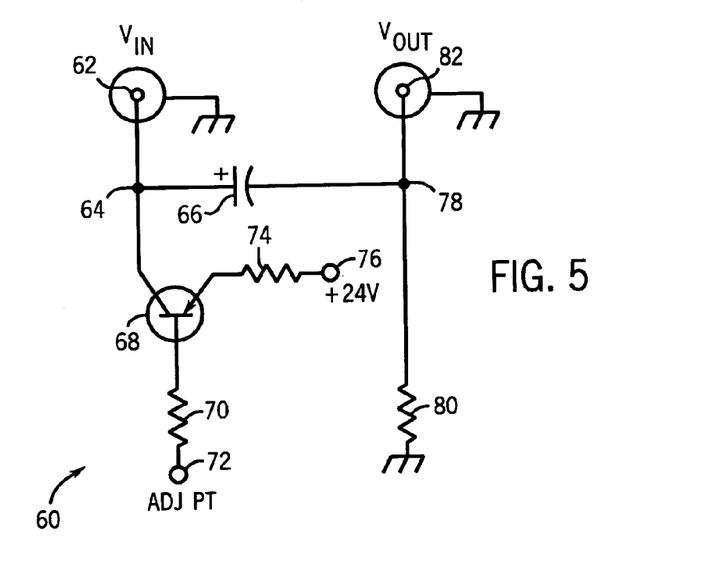
FIG. 5 illustrates a schematic diagram of a decoupler circuit.

An example electronic signal isolation circuit 60 as part of decoupler 42 is depicted as a schematic diagram in FIG. 5. Isolation circuit 60 can be replicated for as many channels as are represented in a system 10. Again, the channels can be representative of a particular sensor's location and associated data. A system 10 can have 8 total channels, for example. Six channels can be devoted to vibration sensors 12 in six locations. The remaining two channels can be devoted to two photo optic sensor 12 data streams in two locations.

Terminal 62 represents the input terminal for circuit 60. Terminal 62 is connected by node 64 to the positive side of polarized capacitor 66 and transistor 68. The base of transistor 68 is connected by resistor 70 to adjustment point 72. Adjustment point 72 can be connected to a trimmer to adjust the current supply. The collector of transistor 68 is coupled to resistor 74, which is coupled in turn to a 24 volt source 76. Node 78 connects grounded resistor 80 and the negative terminal of polarized capacitor 66 with output terminal 82.

Transistor 68 functions to amplify current from the voltage source 76. Transistor 68 supplies current to power an integrated circuit piezoelectric (ICP) transducer device, an example being a common accelerometer as sensor 12. The same wire 20 that supplies the ICP transducer with power also conducts the output signal from the transducer. The output signal is then decoupled or isolated from the power circuit through the capacitor 66, and becomes available as an output signal at output terminal 82. The output signal can then be routed through link 43 to filter 44 or a similar component in remote system 22. Analog filtration can be performed on filter 44, or the electrical signals can be converted to digital signals through A/D conversion. Digital filtration can be performed through central processing unit 58.

Traditionally, dynamic balancing machines provide information to a user which supplies phase angle and amplitude of vibration. Phase angle and amplitude information, usually in the form of degrees and inches-per-second (IPS), respectively, is used to construct a polar chart. A series of concentric circles, roughly corresponding to a target, indicate the relative amplitude of vibration. Phase angle information translates to a specific location (0-360 degrees) on a respective concentric circle on the polar chart. A technician generally tries to minimize vibration amplitude so that the center of the polar chart is realized in a final measurement. The technician adds or removes small amounts of mass from the rotor piece and retests the rotor piece until a measurement falls near the center, or zero mark, of the polar chart.

Figure 6:
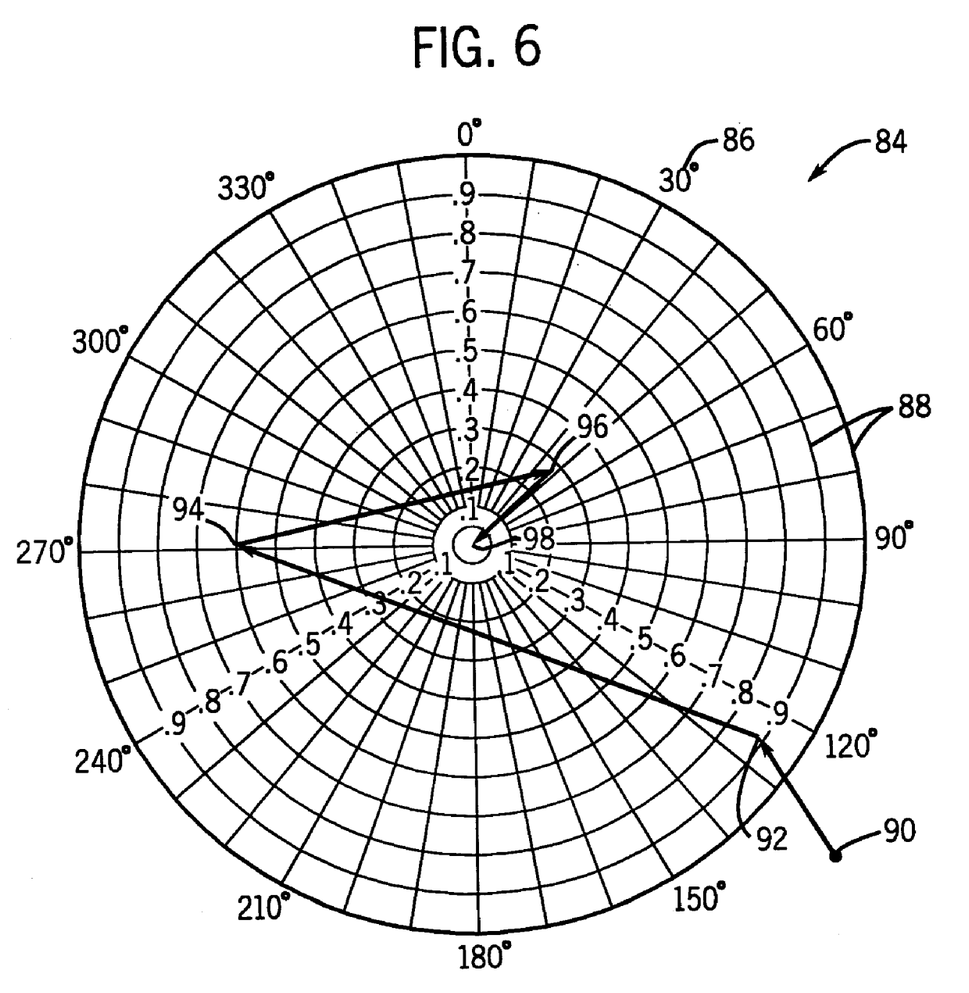
FIG. 6 illustrates an example polar chart used in dynamic balancing.

An example polar balancing chart 84 is shown in FIG. 6, along with sample manual calculations. Chart 84 includes phase angles 86, which range on a scale from 0 to 360 degrees. As described above, a series of equally-spaced concentric circles 88 indicate the amplitude of vibration in terms of inches-per-second (IPS). In one example, reflective tape is installed at the zero-degree mark of a rotor piece. As the rotor piece is rotated, the optical pick-up in photo optic sensor 12 indicates the moment in time that the reflective tape is sensed. Photo optic sensors 12 can work in conjunction with vibration sensors 12 to determine the amplitude and location of vibration. When a vibration is sensed by sensor 12, the difference in time corresponds to an angular location.

The example of chart 84 shows a first test measurement 90. Measurement 90 has an amplitude of 1.219 IPS of vibration at approximately 131.3 degrees on the measured rotor piece. To compensate for this imbalance, four units of mass are added at 120 degrees. The result is measurement 92. Measurement 92 has an amplitude of 0.894 IPS of vibration at approximately 125.4 degrees. To compensate for the imbalance, ten units of mass are added at 150 degrees. The result is measurement 94, which has an amplitude of 0.599 IPS of vibration at 270.4 degrees. Because measurement 94 overshoots the zero mark, ten units of mass are removed from 150 degrees. A new adjustment of six units of mass is made at 120 degrees. The result is measurement 96 having an amplitude of 0.281 IPS at 49.4 degrees. As a final adjustment, two units of mass are added at 210 degrees. As a result, measurement 98 is obtained, which has an amplitude of 0.027 IPS at approximately 43 degrees. The imbalance has now effectively been eliminated.

Onboard software on remote system 22 can be automated to perform essentially the same task as described above. The software can indicate to a user where to remove or add a small amount of mass to a rotor piece to reduce vibration. The software can be written to, in effect, coordinate a series of respective virtual polar charts for every tested rotor piece in a mechanical assembly. The software can simultaneously record and balance multiple components of the system. Remote system 22 can contain a library of data which has been stored on mass storage device 50 during sessions of research and development. Based on the type of mechanical system undergoing vibration reduction, CPU 58 can access the library of data and use conventional methods such as probability theory to make a determination as to what impact the removal or addition of mass to an individual rotor piece will have on the overall vibration of the system.

Through research and development techniques, a technician can develop a certain vibration response or offset that is associated with a particular mechanical system. For example, through trial and error, a technician can discover that some mass adjustment at a particular phase angle measurement of 230.3 degrees is necessary in a certain step of a method of reducing vibration in a particular motor vehicle. The vibration response can become, in effect, a calibration constant which can be incorporated into software operating on remote system 22 and be implemented when a particular mechanical system 10 is being tested.

Consider the following example method A of reducing vibration using vibration reduction system 10 in a motor vehicle as partially depicted in FIG. 1. Example method A can be performed using onboard software located on remote system 22, on an external system or elsewhere. Example method A can also be performed manually using hand-drawn polar charts. Finally, example method A can be performed using a combination of data collection and automation software located on remote system 22, on an external system, or elsewhere.

As a first step, a technician can remove the flywheel from the motor vehicle. The flywheel can be spun balanced using traditional balancing techniques using a conventional dynamic balancing machine. Similarly, the driveshaft 28 of the motor vehicle can be removed from the motor vehicle. Again, the driveshaft can be spun balanced using traditional balancing techniques using a conventional dynamic balancing machine. Removal of the flywheel and driveshaft 28 can serve to reduce overall vibration by eliminating possible large unbalances and corresponding resident vibration before the overall system 10 is analyzed. A clutch plate assembly can be removed from system 10 and also balanced individually. In a separate example, the flywheel and driveshaft 28 are not removed.

Returning to example method A, the technician can begin to assemble components of the mechanical system 10 to balance together. The removed flywheel and a clutch plate assembly can be connected, for example, and balanced. Again, remote system 22 or a similar device can be used to automate some or all of the dynamic balancing steps. A series of balancing polar charts can be constructed if a technician desires to manually accomplish the balancing.

As a next step in method A, the technician can reinstall the flywheel to the motor vehicle. The flywheel is, in effect, connected to bell housing 36 which covers the flywheel. The technician can reinstall the driveshaft 28 to the motor vehicle.

Once the flywheel and driveshaft 28 are reinstalled, the technician can install sensors 12 at various locations in system 10, which have been described above. The technician can install a photo optic sensor 12 on a front support of engine 24 to measure the phase angle of harmonic balancer 40 as shown in FIGS. 3d and 3e. The technician can install reflective tape on harmonic balancer 40 as previously described. The technician can install a photo optic sensor 12 to measure the phase angle of driveshaft 28 using bracket 34 as shown in FIG. 3c. The technician can install reflective tape on driveshaft 28 as previously described.

The technician can install piezoelectric accelerometers or similar vibration sensors 12 in various locations. Vibration sensor 12 can be installed in close proximity to bell housing 36. Sensor 12 can be installed in close proximity to transmission 26 as shown in FIG. 3b. Sensor 12 can be installed to the rear differential 30 as shown in FIG. 3a. Additionally, sensors 12 can be installed to the front and/or rear wheel assemblies or elsewhere as part of system 10.

As a next step in method A, a chassis dynamometer can be employed by the technician. A chassis dynamometer is a treadmill-like device with two large rollers which simulates on-road testing. The motor vehicle can be operated to simulate on-road driving. The chassis dynamometer can be operated where rotor pieces of the motor vehicle produce between 5000 and 9000 revolutions-per-minute (RPM). Vibration which is associated with individual components is produced. The individual vibrations combine into an overall vibration of system 10. The individual vibrations and overall vibrations can be measured and/or recorded by remote system 22. The vibration measured at each sensor 12 is representative of a composite mechanical operation of system 10.

In addition to utilizing a chassis dynamometer, a technician can simply remove both back wheels of the motor vehicle. The aft or rear axle of the motor vehicle can be secured in a stationary position, for example by using jacks. The motor vehicle can again be operated to produce individual and overall vibrations which are measured by sensors 12.

The technician can utilize independent data streams from associated sensors 12 located on system 10 to display, in effect, a picture of vibration in a particular location. The independent data streams represent a composite mechanical operation of system 10. In addition, the data streams can be combined into a composite to give the technician a snapshot of the overall vibration of system 10. The technician can then balance driveshaft 28 as connected to system 10. The technician can examine the overall composite of vibration generated by remote system 22 to compare with the individual vibration associated with driveshaft 28. The technician can use two-plane balancing techniques for driveshaft 28 in combination with software operating on remote system 22 to reduce the overall vibration of system 10. Using a two-plane balancing technique, the technician can use roughly the same phase angle measurement generated from the photo optic sensor 12 mounted on bracket 34. An end of driveshaft 28 with higher vibration can be balanced first. As a final step in method A, the technician can balance the flywheel as part of system 10. The technician can use the phase angle measurement generated from photo optic sensor 12 mounted to a forward support portion of engine 24 to balance the flywheel.

Figure 7:
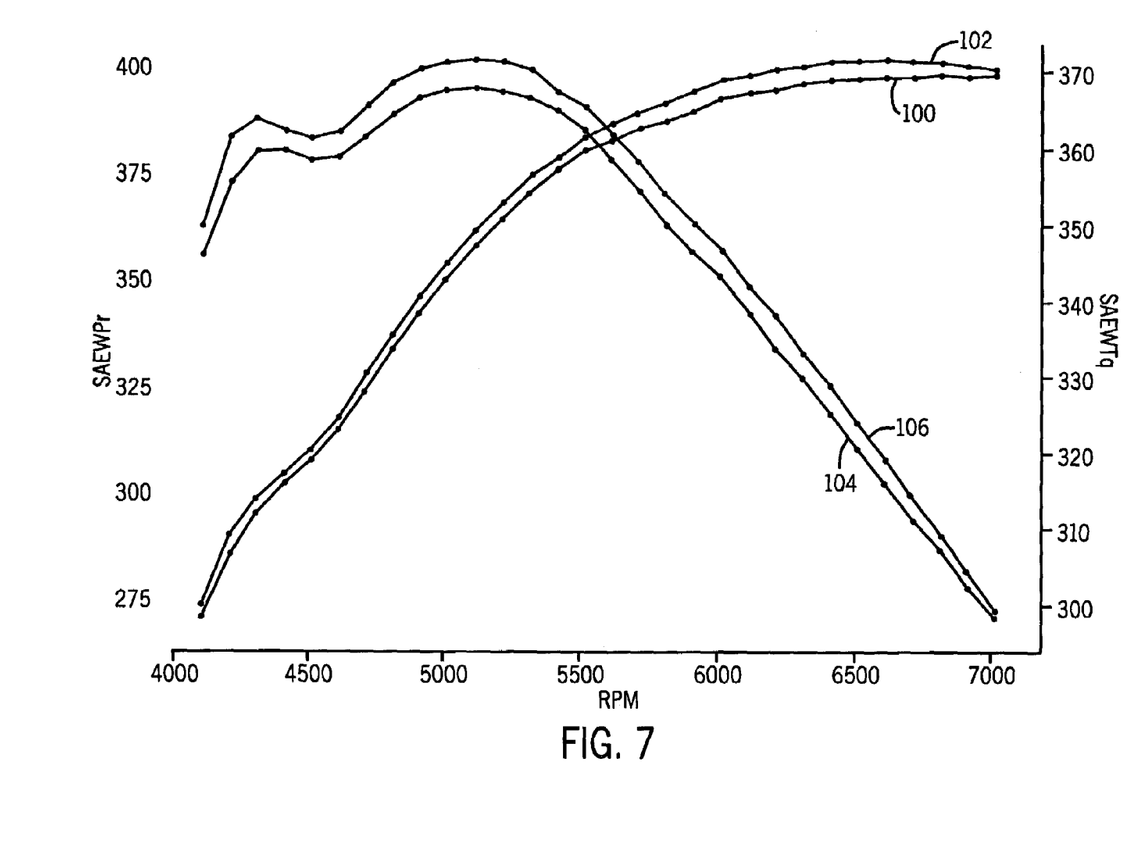
FIG. 7 illustrates a graphical relationship between a reduction in overall vibration and a corresponding increase in power and torque of a motor vehicle.

FIG. 7 illustrates a graphical relationship between a reduction in overall vibration of system 10 and a corresponding increase in power and torque. The speed in RPM of engine 24 is shown on the x-axis. Horsepower sanctioned by the Society of Automotive Engineers (SAE) is depicted on the leftmost y-axis. SAE torque in lb-ft is depicted on the rightmost y-axis. As shown, horsepower measurement 100 depicts an unbalanced system 10 with accompanying overall vibration. Horsepower measurement 102 depicts the corresponding increase in horsepower from a balanced system 10. By reducing overall vibration, a noticeable increase of horsepower (approximately 5) is seen throughout the 4000-7000 RPM range of tested engine 24.

Similarly, torque measurement 104 depicts an unbalanced system 10 with accompanying overall vibration. Torque measurement 106 depicts the corresponding increase in torque from a balanced system 10. By reducing overall vibration, a noticeable increase of torque (approximately 3) is seen throughout the 4000-7000 RPM range of tested engine 24.

Example method A can be adapted to perform a method of reducing vibration in a variety of mechanical assemblies, mechanical systems and mechanized equipment. An adapted method A can be used to reduce overall vibration of an outboard motor of a speedboat, for example. An adapted method A can be used to reduce overall vibration of a boat with an internalized engine and drivetrain. An adapted method A can be used to reduce overall vibration in manufacturing equipment, such as a large manufacturing machine which has a number of subassemblies with associated revolving parts. An adapted method A can be used to reduce overall vibration in power tools which have subassemblies with associated revolving parts.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of reducing vibration in a motor vehicle, comprising:
   removing a flywheel subassembly from the motor vehicle;
   spin balancing the flywheel assembly on a balancing machine;
   removing a driveshaft subassembly from the motor vehicle;
   spin balancing the driveshaft assembly on a balancing machine;
   removing a clutch plate subassembly from the motor vehicle;
   spin balancing the clutch plate assembly on a balancing machine;
   connecting the flywheel and the clutch plate subassemblies to form an interconnected flywheel and clutch plate assembly;
   balancing the flywheel and clutch plate assembly as an interconnected unit;

reconnecting the flywheel subassembly, the flywheel and clutch plate assembly, and the driveshaft subassembly to the motor vehicle;

measuring phase angles of a harmonic balancer, the driveshaft subassembly, and the flywheel subassembly of the motor vehicle;

operating the motor vehicle to obtain a plurality of vibration measurements from a plurality of vibration sensors mounted to a bell housing subassembly, a transmission subassembly, and a rear differential subassembly; and rebalancing the driveshaft subassembly and flywheel subassembly using the phase angles of the driveshaft subassembly and flywheel subassembly.

2. The method of claim 1, further including combining the plurality of vibration measurements to obtain a composite representation of an overall vibration of the motor vehicle.

3. The method of claim 1, further including recording each of the plurality of vibration measurements by a remote system for data analysis.

4. The method of claim 1, wherein operating the motor vehicle to obtain a plurality of vibration measurements further includes removing a rear wheel of the motor vehicle and securing a rear axle in a stationary position.

5. The method of claim 1, wherein operating the motor vehicle to obtain a plurality of vibration measurements further includes operating the motor vehicle on a chassis dynamometer, wherein the driveshaft subassembly is rotated between 5000 and 9000 revolutions-per-minute (RPM).

6. The method of claim 1, wherein the plurality of vibration measurements are transmitted to a remote system.

7. The method of claim 6, wherein the plurality of vibration measurements are electronically filtered to reduce electrical noise.

8. The method of claim 1, wherein measuring phase angles of a harmonic balancer, the driveshaft subassembly, and the flywheel subassembly of the motor vehicle further includes installing a plurality of photo optic sensors in optical communication with a plurality of reflective surfaces on the harmonic balancer, driveshaft subassembly, and flywheel subassembly.

9. The method of claim 1, wherein the plurality of vibration sensors further include a plurality of piezoelectric accelerometers.

10. A method of reducing vibration in a motor vehicle, comprising:

balancing a flywheel and clutch plate assembly as an interconnected unit;

affixing reflective tape to a surface of each of a harmonic balancer, a driveshaft subassembly, and a flywheel subassembly of the motor vehicle;

viewing the reflective tape using a photo optic sensor to obtain phase angle measurements of the harmonic balancer, the driveshaft subassembly, and the flywheel subassembly;

operating the motor vehicle to obtain a plurality of vibration measurements from a plurality of vibration sensors mounted to a bell housing subassembly, a transmission subassembly, and a rear differential subassembly; and balancing the drive shaft subassembly and flywheel subassembly using the phase angle measurements of the driveshaft subassembly and flywheel subassembly.

11. The method of claim 10, further including, prior to balancing the flywheel and clutch plate assembly as an interconnected unit, removing the flywheel subassembly from the motor vehicle and spin balancing the flywheel assembly on a balancing machine.

12. The method of claim 11, further including, prior to balancing the flywheel and clutch plate assembly as an interconnected unit, removing the driveshaft subassembly from the motor vehicle and spin balancing the driveshaft assembly on a balancing machine.

13. The method of claim 12, further including, prior to balancing the flywheel and clutch plate assembly as an interconnected unit, removing a clutch plate subassembly from the motor vehicle, spin balancing the clutch plate assembly on a balancing machine, and connecting the flywheel and the clutch plate subassemblies to form an interconnected flywheel and clutch plate assembly.

14. The method of claim 10, further including combining the plurality of vibration measurements to obtain a composite representation of an overall vibration of the motor vehicle.

15. The method of claim 10, further including recording each of the plurality of vibration measurements by a remote system for data analysis.

16. The method of claim 10, wherein operating the motor vehicle to obtain a plurality of vibration measurements further includes removing a rear wheel of the motor vehicle and securing a rear axle in a stationary position.

17. The method of claim 10, wherein operating the motor vehicle to obtain a plurality of vibration measurements further includes operating the motor vehicle on a chassis dynamometer, wherein the driveshaft subassembly is rotated between 5000 and 9000 revolutions-per-minute (RPM).

18. The method of claim 10, wherein the plurality of vibration measurements are transmitted to a remote system.

19. The method of claim 10, wherein the plurality of vibration measurements are electronically filtered to reduce electrical noise.

20. A system for reducing vibration in a motor vehicle, comprising:

a balancing machine which spin balances a flywheel subassembly of the motor vehicle;

a photo optic sensor adapted to connect to the motor vehicle, the photo optic sensor in optical communication with a reflective tape adapted to mount to a surface of a driveshaft subassembly for obtaining a phase angle measurement; and a first vibration sensor adapted to couple to a first end of the driveshaft subassembly for obtaining a first vibration measurement, wherein:

the flywheel subassembly is removed from the motor vehicle and spun balanced by the balancing machine, the driveshaft subassembly is removed from the motor vehicle and spun balanced by the balancing machine, then reconnected to the motor vehicle, the flywheel subassembly is connected to a clutch plate subassembly to form a flywheel and clutch plate assembly, the flywheel and clutch plate assembly then balanced, the motor vehicle is operated to obtain the first vibration measurement from the first vibration sensor, and the driveshaft subassembly is rebalanced using the phase angle measurement of the driveshaft subassembly and the first vibration measurement from the first vibration sensor.

21. The system of claim 20, further including a second vibration sensor adapted to couple to a second end of the driveshaft subassembly to provide a second vibration measurement, the first and second vibration measurements sent to a remote system for analysis.

22. The system of claim 21, wherein pursuant to a two-plane balancing technique and the first and second vibration measurements, the first end or the second end of the driveshaft subassembly having the greatest vibration is balanced first.

23. The system of claim 21, wherein the first and second vibration measurements are combined by the remote system to obtain a composite representation of an overall vibration of the motor vehicle.

24. A method of manufacturing a system for reducing vibration in a motor vehicle, comprising:
providing a photo optic sensor adapted to connect to the motor vehicle, the photo optic sensor in optical communication with a reflective tape adapted to mount to a surface of a driveshaft subassembly for obtaining a phase angle measurement; and
providing a first vibration sensor adapted to couple to a first end of the driveshaft subassembly for obtaining a first vibration measurement, wherein:
the driveshaft subassembly is first removed from the motor vehicle and spun balanced by a balancing machine, then reconnected to the motor vehicle,
the motor vehicle is operated to obtain the first vibration measurement from the first vibration sensor, and
the driveshaft subassembly is rebalanced using the phase angle measurement of the driveshaft subassembly and the vibration measurement from the first vibration sensor.

25. The method of manufacture of claim 24, further including providing a second vibration sensor adapted to couple to a second end of the driveshaft subassembly to provide a second vibration measurement, the first and second vibration measurements sent to a remote system for analysis.

26. The method of manufacture of claim 24, wherein pursuant to a two-plane balancing technique and the first and second vibration measurements, the first end or the second end of the driveshaft subassembly having the greatest vibration is balanced first.

27. The method of manufacture of claim 24, wherein the first and second vibration measurements are combined by the remote system to obtain a composite representation of an overall vibration of the motor vehicle.

* * * * *